United States Patent [19]

Kjellander

[11] Patent Number: 4,718,985
[45] Date of Patent: Jan. 12, 1988

[54] SYSTEM FOR DIAPHRAGM DISTILLATION
[75] Inventor: Nils Kjellander, Handen, Sweden
[73] Assignee: Svenska Utvecklings AB, Sweden
[21] Appl. No.: 840,969
[22] PCT Filed: May 31, 1985
[86] PCT No.: PCT/SE85/00229
  § 371 Date: Jan. 29, 1986
  § 102(e) Date: Jan. 29, 1986
[87] PCT Pub. No.: WO86/00026
  PCT Pub. Date: Jan. 3, 1986

[30] Foreign Application Priority Data
  Jun. 7, 1984 [SE] Sweden ............... 8403081

[51] Int. Cl.$^4$ .............................. B01D 3/04
[52] U.S. Cl. .................... 202/172; 202/186;
  202/235; 202/237; 159/DIG. 27; 159/DIG. 28;
  159/DIG. 32; 203/10; 203/DIG. 9; 203/DIG. 17
[58] Field of Search ............... 202/172, 186, 235, 237,
  202/267 R, 185.1; 159/DIG. 27, DIG. 28,
  DIG. 32; 203/10, DIG. 17, DIG. 9, 87, 12

[56] References Cited
U.S. PATENT DOCUMENTS

| | | | |
|---|---|---|---|
| 3,355,364 | 11/1967 | Hammond | 202/172 |
| 3,406,096 | 10/1968 | Rodgers | 202/172 |
| 3,520,803 | 7/1970 | Iaconelli | 159/DIG. 27 |
| 3,563,860 | 2/1971 | Henderycky | 202/172 |
| 3,650,905 | 3/1972 | Rodgers | 202/172 |
| 3,765,981 | 10/1973 | Rodgers | 159/DIG. 27 |
| 3,783,107 | 1/1974 | Kohlmüller | 159/DIG. 28 |
| 3,878,054 | 4/1975 | Rodgers | 203/11 |
| 4,391,676 | 7/1983 | Torberger | 202/173 |
| 4,402,793 | 9/1983 | Petrek et al. | 203/10 |
| 4,441,963 | 4/1984 | Li | 202/172 |
| 4,545,862 | 10/1985 | Gore et al. | 202/172 |
| 4,583,996 | 4/1986 | Sakata et al. | 55/158 |

Primary Examiner—S. Leon Bashore
Assistant Examiner—V. Manoharan
Attorney, Agent, or Firm—Silverman, Cass, Singer & Winburn, Ltd.

[57] ABSTRACT

A system for diaphragm distillation of a liquid, for example for desalination of salt water, comprising a diaphragm, through which vapor, but not liquid can pass, and a condensation surface for condensing vapor having passed through the diaphragm, and necessary passageways. According to the invention, the system comprises one or several units, each of which comprises a plurality of pipes located one within the other, viz. a first (1) inner pipe, a second (2) pipe located outside thereof and consisting of a diaphragm of the aforesaid kind, and a third (3) pipe located outside the second (2) pipe, which first (1) and third (3) pipes are of a gas-tight material, that said unit is surrounded by a fourth (4) gas-tight pipe, where a first (5) passageway is formed by the first (1) pipe and a second (6), a third (7) and a fourth (8) passageway are formed between said pipes (1,2;2,3;3,4) in successive order in the direction from the inside outward. The said passageways (5,6,7,8) in radial order are intended to transport a warm medium (WW) for the supply of heat, to transport the liquid (SW) to be distilled, to condense gas having passed through the diaphragm (2) and to transport distillate (PW) which has been condensed, where the condensation of the gas takes place against a condensation surface, which consists of the passageway surface opposite to the diaphragm (2), and, respectively, to transport a cold medium (CW) for heat removal.

5 Claims, 3 Drawing Figures

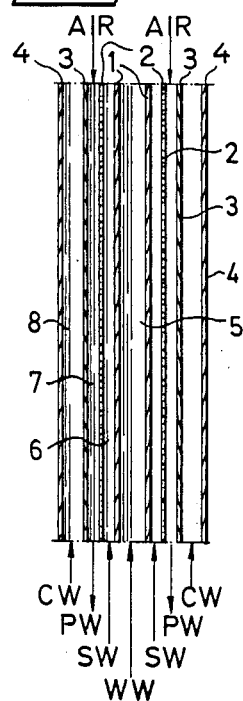
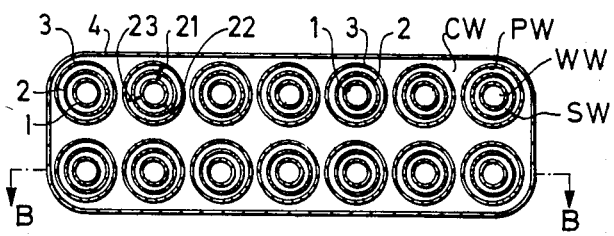
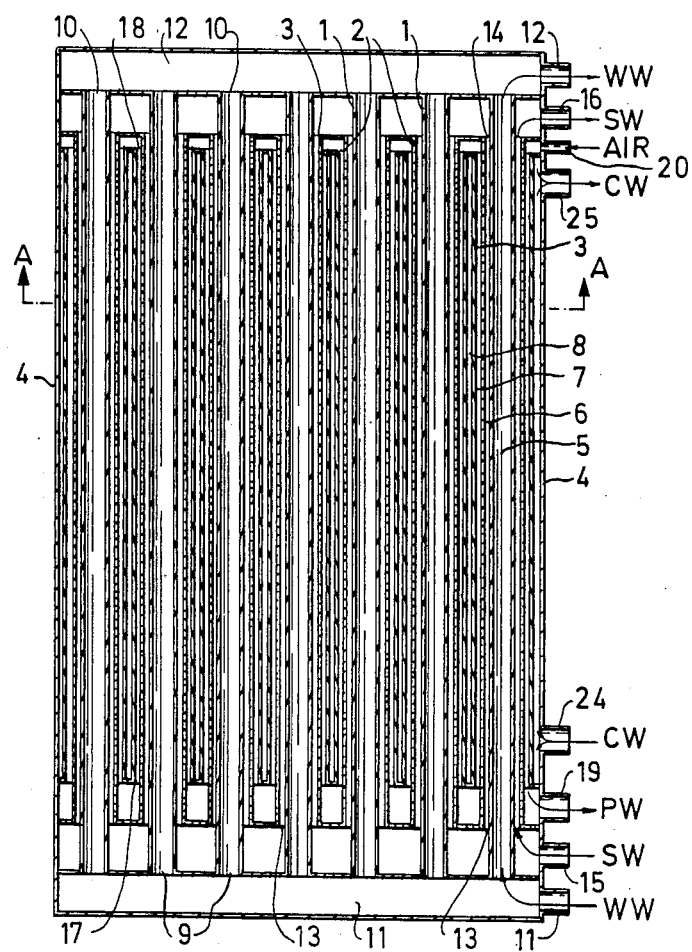

SYSTEM FOR DIAPHRAGM DISTILLATION

This invention relates to a system for diaphragm distillation.

Systems for diaphragm distillation are previously known, for example for sea water desalination. One such system is known from SE-PS No. 8002233-8.

In this patent a system is described to comprise a diaphragm, the properties of which are such that vapor is permitted to pass through the diaphragm while liquid cannot pass therethrough. In parallel with the diaphragm a condensation surface is located and, furthermore, heat exchangers are provided, the object of which is to maintain the liquid to be distilled warm and to maintain the condensation surface cooled by a colder liquid flowing past.

The present invention has the object to combine in one and the same system diaphragm distillation and the heat exchange required for the distillation process.

The invention implies that a simple and compact unit is obtained, which can be coupled together with additional units, each of which comprises diaphragm, condensation surface and heat exchanging surfaces.

The present invention, thus, relates to a system for diaphragm distillation of a liquid, such as for desalinating sea water, comprising a diaphragm, through which vapor but not liquid is permitted to pass, and a condensation surface for condensing vapour having passed through the diaphragm, and necessary passageways. The invention is characterized in that the system comprises one or more units, each of which comprises a plurality of pipes located one within the other, viz. a first inner pipe, a second pipe located outside thereof and consisting of a diaphragm of the afore-mentioned kind, and a third pipe located outside the second pipe, the said first and the said third pipe being of a gas-tight material, that the said unit is surrounded by a fourth gas-tight pipe, and a first passageway is formed by said first pipe, and a second, a third and a fourth passageway are formed between said pipes in successive order in the outward from inside direction, and that said passageways in radial order are intended to transport a hot medium for heat supply, to transport the liquid to be distilled to condensate gas having passed through the diaphragm and to transport distillate having been condensed, which condensation of the gas takes place against a condensation surface, which consists of the passagway surface opposite to the diaphragm, and, respectively, to transport a cold medium for conducting away heat.

BRIEF DESCRIPTION OF THE DRAWINGS

The invention is described in the following in greater detail, with reference to an embodiment thereof shown in the accompanying drawing where FIG. 1 is a section through a unit assembled of several pipes, FIG. 2 shows schematically a system comprising several units, seen by way of a horizontal section A—A marked in FIG. 3, and FIG. 3 shows the system shown in FIG. 2, seen by way of a sectional view B—B marked in FIG. 2.

Diaphragm distillation is a method of effecting distillation at a relatively low temperature without overpressure or vacuum. In diaphragm distillation a difference in temperature is maintained between the liquid to be distilled and the surface, against which condensation of gas having passed through the diaphragm takes place. Heat, therefore, is supplied to the liquid to be distilled, and heat is removed from the condensation surface.

FIG. 1 is a schematic view of a section through a unit according to the invention assembled of several pipes. In FIG. 1 only a part of the unit length is shown. One or several such units can be utilized together.

Each unit comprises a plurality of pipes located one inside the other, viz. a first inner pipe 1, a second pipe 2 located outside the same, and a third pipe 3 located outside the second pipe 2. The unit is surrounded by a fourth pipe 4. The first pipe 1, the third pipe 3 and the fourth pipe 4 are made of a liquid and gas-tight or impermeable material, for example plastic or metal. The pipes 1,3,4 should be made of a material which has good thermal conduction properties and is corrosion resistant. The second pipe 2 consists of a diaphragm, which in known manner is designed so as to permit vapor, but not liquid to pass therethrough.

By the arrangement shown in FIG. 1, a first passageway 5 is formed by the first, inner, pipe 1. A second passageway 6, and a third and fourth passageway 7 and 8 are formed between said pipes 1 and 2, 2 and 3, and 3 and 4, respectively i.e., in successive order from inside to outside.

The said passageay 5, 6, 7 and 8 in radial order are intended to transport a hot medium for the supply of heat, to transport the liquid to be distilled, to condense gas having passed through the diaphragm 2, and to transport distillate having been condensed and, respectively, to transport a cold medium for the removal of heat. The said radial order can be from inside outward or from outside inward, because two passageways 5,6 are located inside of the diaphragm 2 and two passageways 7,8 outside of said diaphragm.

The invention is described below with reference to the desalination of sea water which, however, constitutes only an example. The invention is not restricted to such an application, but can be utilized for each liquid to be diaphragm distilled.

In the following example, furthermore, the first inner pipe is assumed to be intended to transport a hot medium. In FIGS. 1,2 and 3 "WW" designates warm water, "SW" designates salt water, "PW" designates product water, "CW" designates cold water and "AIR" designates air.

The system operates as follows. Warm water WW is pumped through the first passagweay 5. The wall of the first pipe 1 is thereby heated, whereby salt water SW pumped through the second passageway 6 is heated. The heated salt water emits water vapor which passes through the diaphragm 2 into the third passageway 7. The surface of the third pipe 3 is cooled by cold water CW, which is pumped through the fourth passageway 8, to a temperature below the dew point of the vapor. Vapor having passed through the diaphragm condenses against the inside of the third pipe 3, which surface thus constitutes the condensation surface, and the condensed fresh water PW is conducted away by the third passageway 7 to a collecting tank or the like. The product water, thus, is desalinated salt water.

The structural design of the system implies that it comprises both distillation elements and heat exchangers. The system, therefore, is simple and compact compared with known systems.

The way in which the water in the first passageway is heated or the water in the fourth passageway possibly is cooled, does not constitute a part of the present invention. It is, however, possible to heat water WW by means of solar panels and thereafter to pump this water into the first passageway 5. The cold water CW can, for example, consist of sea water in cases when the salt water SW is sea water. The system then can be arranged at or in the sea.

A heat pump can be utilized for heating and, respectively, cooling water to be pumped into the system.

The system preferably is positioned so that the longitudinal axis of the unit is vertical.

The third passageway 7 preferably is connected at its upper end to the free atmosphere or to a suitable gas.

The reason for this is to prevent a vacuum to be produced in the third passageway 7 at the condensation of the vapor. In order to maintain a radial distance between the diaphragm 2 and the condensation surface, i.e. the inside of the third pipe 3, according to a preferred embodiment a distance member is provided in the third passageway 7. Such a distance member can be, for example, a net, a folded plastic section or another suitable member.

The first pipe 1 and the third pipe 3 can consist of thin plastic foils. In such a case distance members of the aforementioned kind can be provided in several or all of the passageways 5,6,7,8.

The unit described above is particularly suitable for being coupled in parallel with several similar units to a greater unit.

In such a case the fourth, outer pipe 4 is designed to enclose several units, each of which comprises said first, second and third pipe 1,2 and 3.

In FIGS. 2 and 3 an embodiment of a system is shown where fourteen units have been coupled in parallel, and the fourth pipe 4 encloses all units. In FIGS. 2 and 3 the same designations have been used for corresponding details as in FIG. 1.

According to a preferred embodiment, shown in FIGS. 2 and 3, each of the units is designed so that the pipes have different lengths. The first inner pipes 1 are the longest ones and open with their respective ends 9,10 into a supply and, respectively, removal passageway 11,12. The said second pipes, i.e. the diaphragms 2, are shorter and open with their respective ends 13,14 into a supply and, respectively, removal passageway 15,16.

The third pipes 3 are shorter than said second pipes 2 and open with their respective ends 17,18 into a removal passageway 19 for distillate and, respectively, into a supply passageway 20 for air. The said fourth pipe 4 encloses all units and is provided with a supply passageway 24 and a removal passageway 25. At the embodiment shown in FIG. 3 warm water WW is transported in the first passageway 5 and salt water SW is transported in the second passageway 6. In the fourth passageway 8 cold water CW is transported. Product water PW is taken out from the third passageway 7 via the removal passageway 19. Air is permitted to pass in to the third passageway 7 via the supply passageway 20. All of the first, third and, respectively, fourth passageways are mutually connected at their lower and, respectively, upper ends.

Each of said passageways 5,6,7,8, thus, are connected to each other by having supply and removal passageways in common, so that all units thereby are connected in parallel.

Such a system is very compact and yields a high production of desalinated sea water. The structural design of the units permits great variation in respect of the number of units, which is of great advantage because of the demand of systems having low capacity or high capacity. What has to be adapted to the capacity is only the number of units, the size of the fourth, outer pipe 4 and the attachment means for the remaining pipes.

The attachment means may be, for example, three spokes 21,22,23 between each of adjacent pipes, as shown in FIG. 2. Such sets of spokes can be located at the ends of the pipes and possibly in one or several places along the length of the pipes.

In all Figures the first, second and third pipes 1,2,3 are shown to be circular-cylindric. Although this design is preferred, of course, the pipes can be given any desired cross-sectional shape, for example square shape.

At times it is desired to bring about turbulene in the passageways in excess to that occurring naturally in the passageways. For this purpose, means for giving rise to turbulence can be inserted in the passageways, for example a net, blades or other details.

It is obvious that the system can be modified in many ways apparent to the expert without abandoning the basic idea of the invention, viz. to arrange the different pipes one within the other.

The present invention, thus, must not be restricted to the embodiments set forth above, but can be varied within the scope of the attached claims.

I claim:

1. In a system for diaphragm distillation of a liquid, which system includes a diaphragm through which a vapor but not a liquid can pass and a condensation surface for condensing said vapor after said vapor has passed through said diaphragm, the improvement comprising;

at least one unit having a first inner pipe, said first pipe having a first passageway located longitudinally therein, a second pipe surrounding said first pipe and defining therewith a second passageway substantially parallel to and surrounding said first passageway, and a third pipe surrounding said second pipe and defining therewith a third passageway substantially parallel to and surrounding said second passageway; and a fourth pipe surrounding said at least one unit and defining with said third pipe a fourth passageway substantially parallel to and surrounding said third passageway;

said first pipe having a wall consisting essentially of a material through which neither vapor nor liquid can permeate, said first passageway being used for transporting a heated medium for heating said first pipe, said second pipe comprising said diaphragm, said second passageway being used for transporting said liquid to be distilled, said liquid being heated by said first pipe, said third pipe having a wall consisting essentially of a material through which neither vapor nor liquid can permeate, said third passageway being used for condensing and collecting vapor from said liquid which passes through said second pipe, said fourth pipe having a wall consisting essentially of a material through which neither vapor nor liquid can permeate, said fourth passageway being used for transporting a cold medium for cooling said third pipe to facilitate the condensing of said vapor.

2. A system as defined in claim 1, wherein said at least one unit comprises a plurality of units, the outer fourth pipe (4) enclosing all of said units.

3. A system as defined in claim 1, characterized in that said first (1), second (2) and third (3) pipes are circular-cylindric.

4. A system as defined in claim 1, characterized in that several units are utilized, and each of said respective passageways (5, 6, 7, 8) are interconnected by respective supply and removal passageways (11, 12, 15, 16, 19, 20).

5. A system as defined in claim 4, characterized in that each of the units is designed so that the pipes have different lengths, such that the first (1) pipes are the longest ones and open with their respective ends (9,10) into a supply and, respectively, removal passageway (11,12), that the second (2) pipes are shorter and open with their respective ends (13,14) into a supply and, respectively, removal passageway (15,16), and the third (3) pipes are shorter than the second (2) pipes and open at their respective ends (17,18) into a removal passageway (19) for distillate and, respectively, a supply passageway (20) for air and that said fourth (4) pipe encloses all units and is provided with a supply passageway (24) and a removal passageway (25).

* * * * *